United States Patent

Miller et al.

[15] 3,678,677
[45] July 25, 1972

[54] DE-VINING MELONS

[72] Inventors: Rodney D. Miller; John K. Nielsen, both of San Jose, Calif.

[73] Assignee: FMC Corporation, San Jose, Calif.

[22] Filed: Aug. 13, 1970

[21] Appl. No.: 63,370

[52] U.S. Cl..............................56/327, 56/DIG. 1, 130/5 D
[51] Int. Cl..........................................A01g 19/00
[58] Field of Search..........................56/1 R, DIG. 1, 327 R; 130/30 R, 30 D, 5 D; 146/55

[56] References Cited

UNITED STATES PATENTS

| | | | |
|---|---|---|---|
| 2,819,745 | 1/1958 | Minerva | 146/55 |
| 3,113,574 | 12/1968 | Greedy | 130/5 D |
| 2,610,633 | 9/1952 | Jozwik | 56/DIG. 1 |
| 3,387,611 | 6/1968 | Lecker | 56/DIG. 1 |
| 3,331,197 | 7/1967 | O'Brien | 56/327 R |

*Primary Examiner*—Antonio F. Guida
*Attorney*—F. W. Anderson and C. E. Tripp

[57] ABSTRACT

In a once-over field harvesting operation, melons and attached vines are gathered. The melons and their vines are dropped onto a parallel roll de-viner assembly having a trough conveyor that runs axially along cooperating vine removal and pinch rollers that grip the vines from the sides of the fruit and direct them downwardly between adjacent lanes. The roller assembly is independently pivoted on the frame to adjust its angle of inclination which is selected to minimize melon bounce. The pinch rollers are mounted for a limited radial motion in order to clear clumps of vines passing between the pinch rollers and the vine removal rollers beneath them.

19 Claims, 17 Drawing Figures

Patented July 25, 1972
3,678,677
6 Sheets-Sheet 1
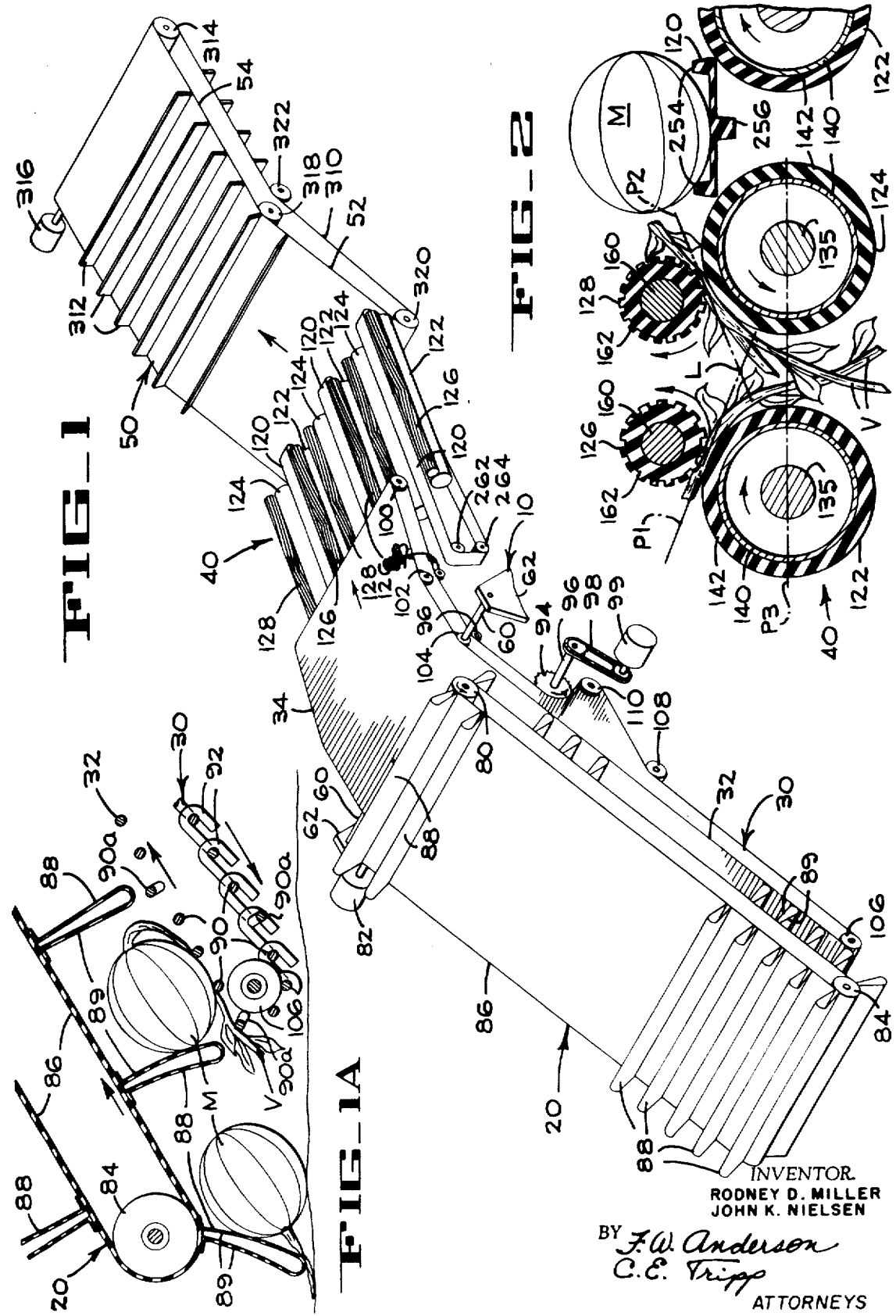
INVENTOR.
RODNEY D. MILLER
JOHN K. NIELSEN
BY F.W. Anderson
C.E. Tripp
ATTORNEYS

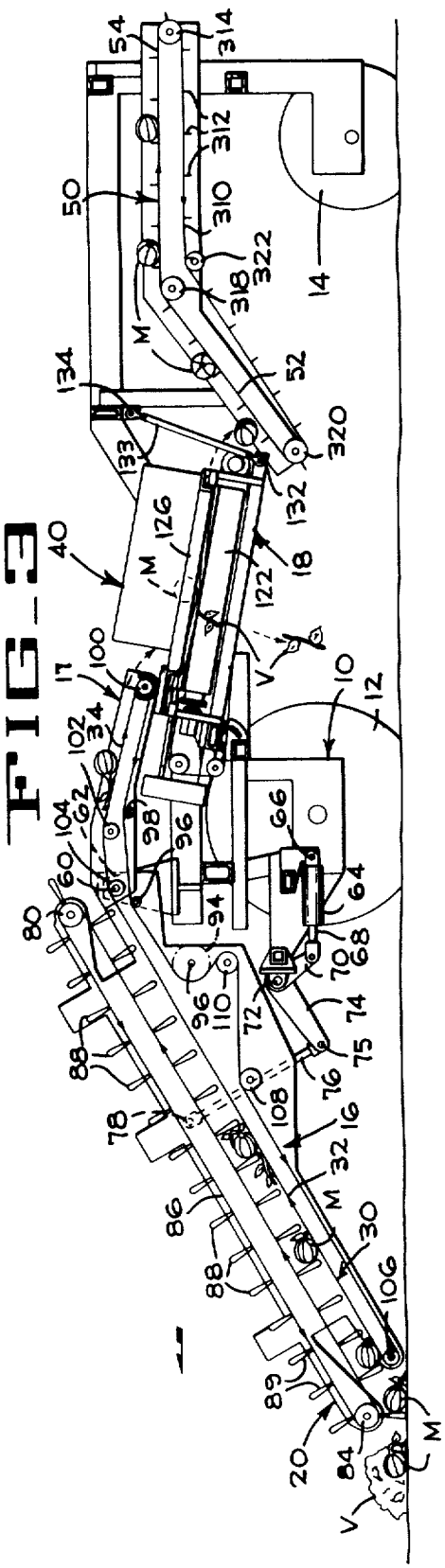

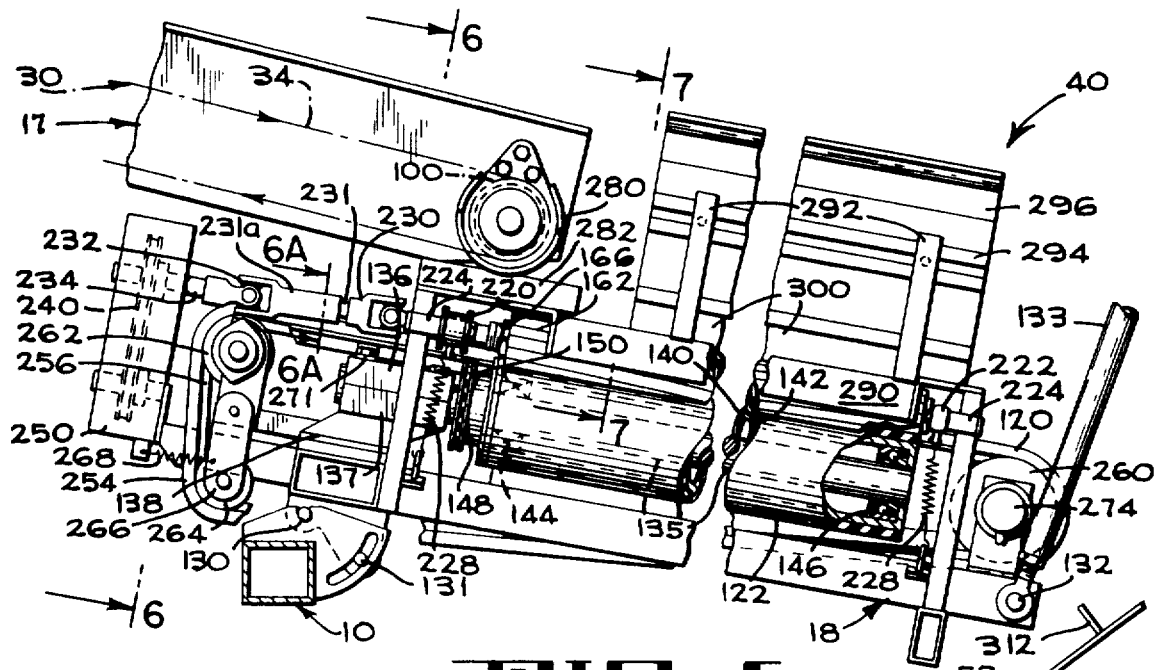
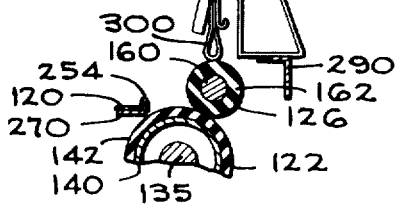
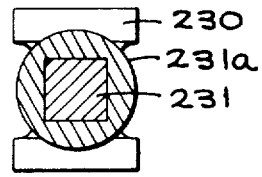
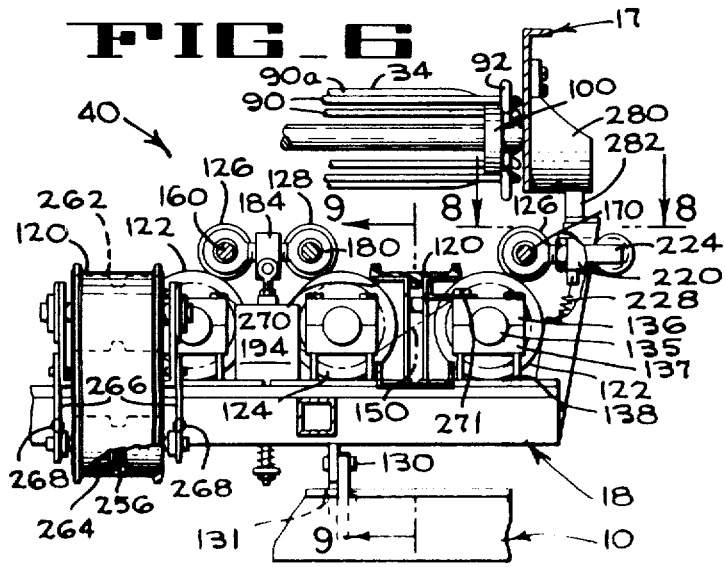
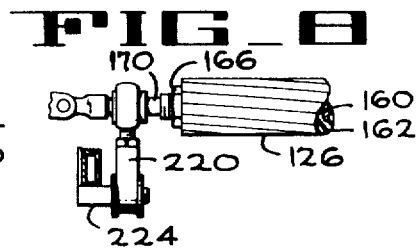

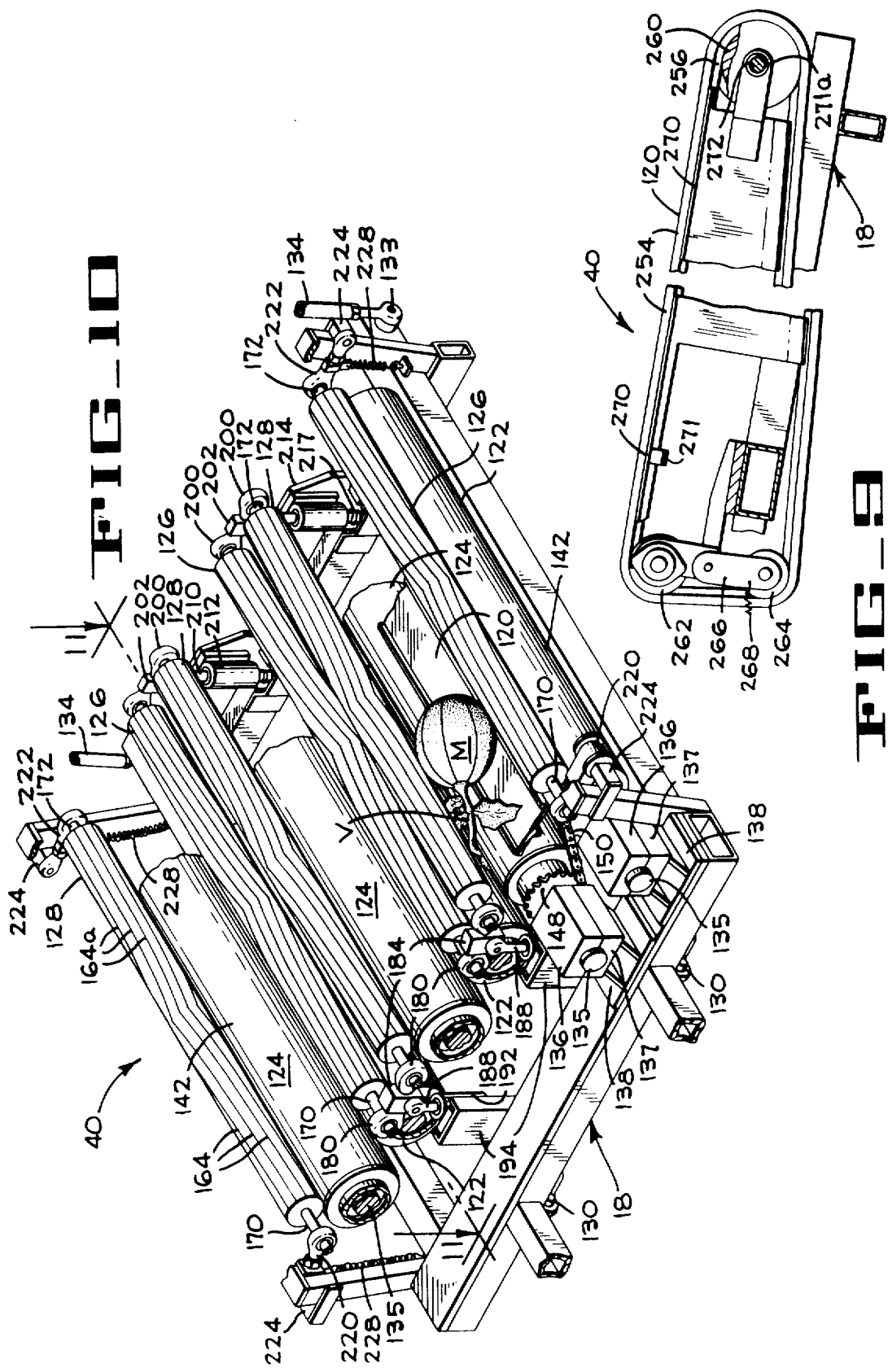

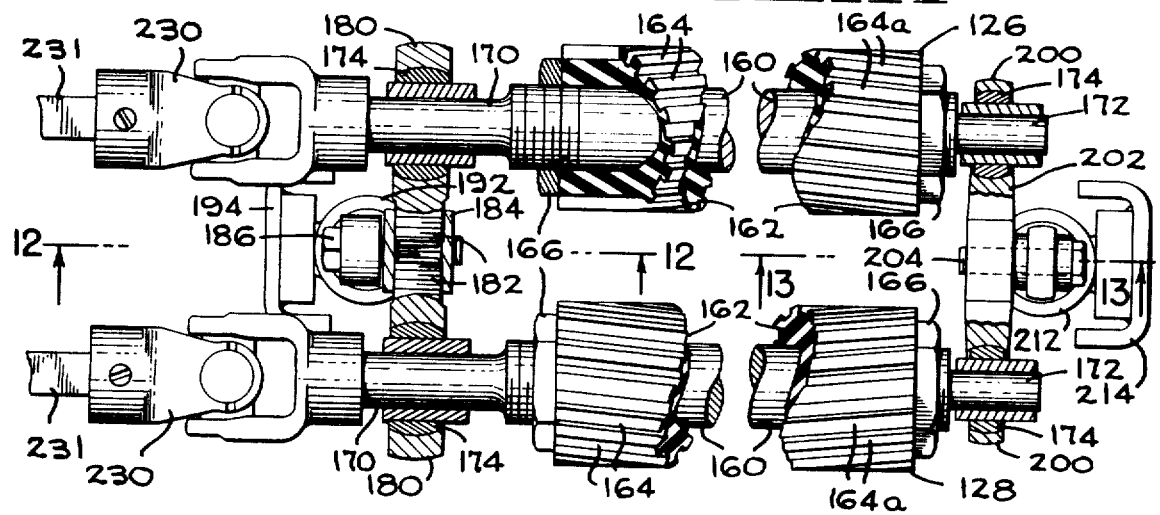
FIG. 11
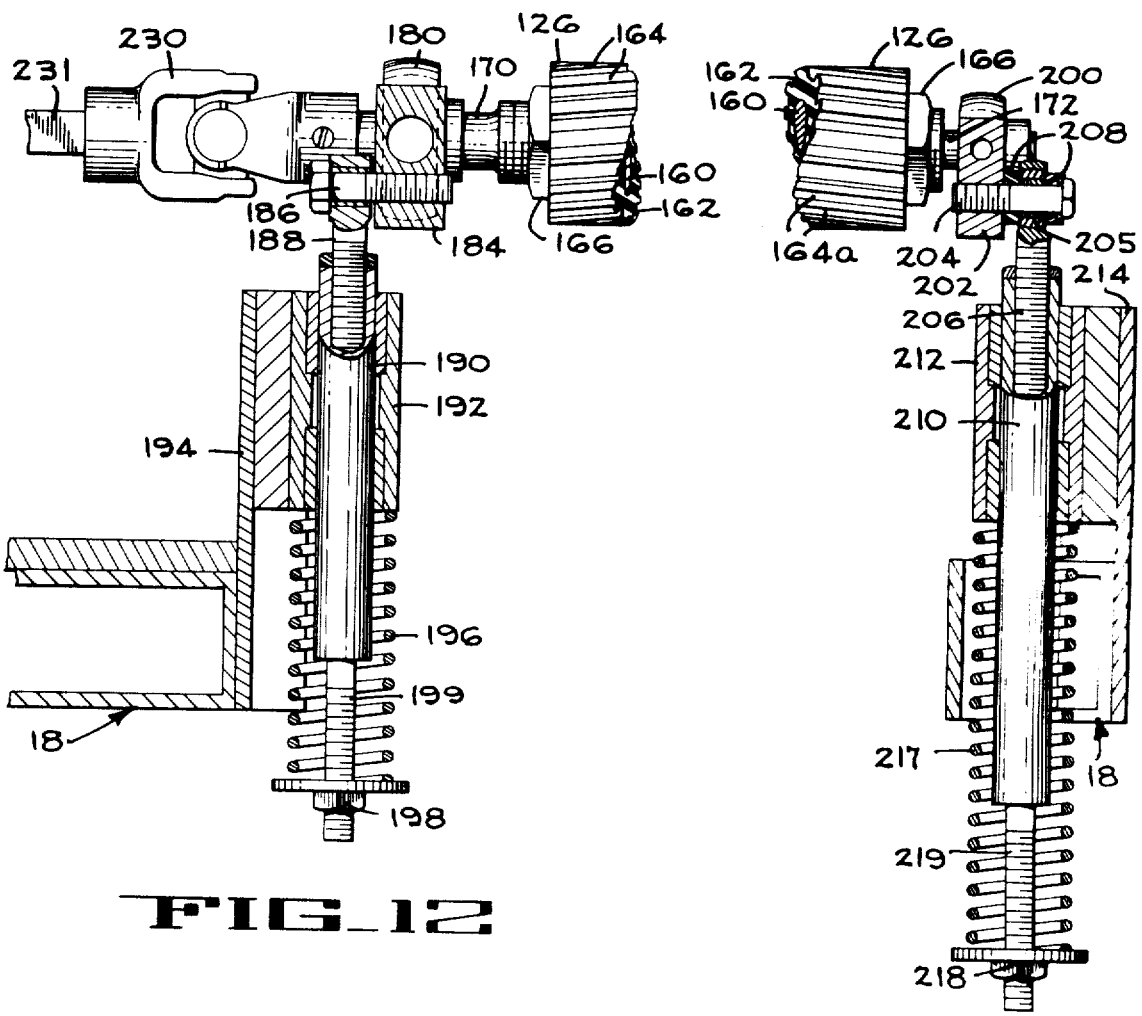
FIG. 12
FIG. 13

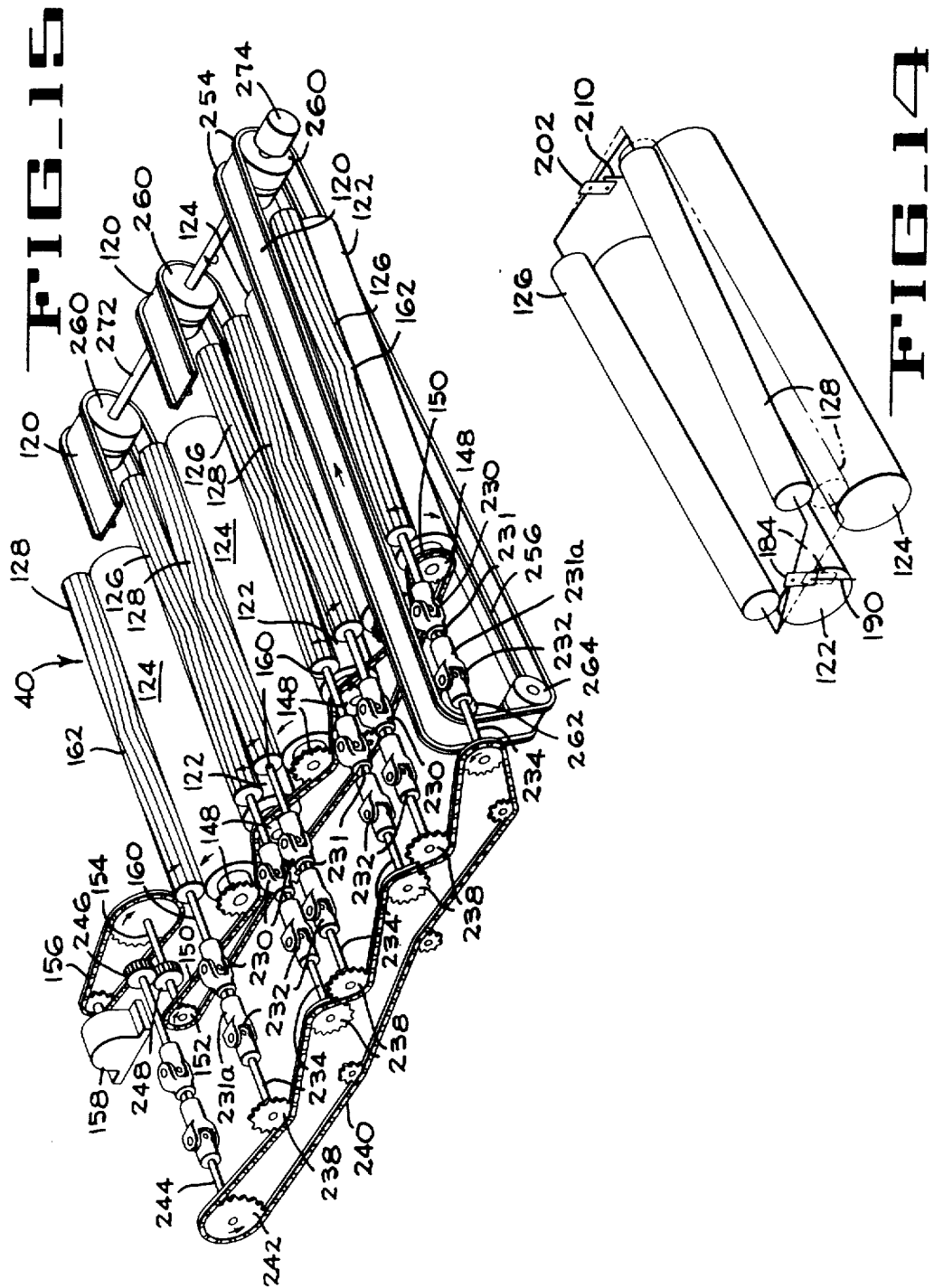

DE-VINING MELONS

FIELD OF THE INVENTION

This invention relates to harvesting and more particularly to a melon harvester which gathers melons and vines in a once-over harvesting operation and plucks the vines from the melons.

BRIEF DESCRIPTION OF PRIOR ART

A melon harvester that redeposits stripped vines onto the field for further harvesting appears in the U.S. Pat. to O'Brien No. 3,331,197, issued July 18, 1967.

A bean picking machine having downwardly inclined parallel rollers that cooperate to form lanes of pinch roller assemblies is shown in U.S. Pat. to Ferrell No. 1,240,693, issued Sept. 18, 1917.

The use of axial lanes formed by adjacent parallel rollers for sorting beans is shown in the U.S. Pat. to Johnson No. 1,148,589, issued Aug. 3, 1915 and a similar machine having rubber covered rolls appears in the U.S. Pat. to Bussard No. 1,723,539, issued Aug. 6, 1929.

The use of sponge rubber pinch rolls in a tobacco sizing machine is shown in the U.S. Pat. to Schumacher, No. 844,049, issued Feb. 12, 1907.

SUMMARY OF THE INVENTION

The principle object of the present invention is to harvest and de-vine melons without damage to the crop. The invention is particularly useful in a once-over harvesting operation wherein the melons are necessarily almost all ripe, and hence readily damaged.

Another object is to minimize damage to the melons due to bouncing or rough handling during the de-vining operation.

These objects and advantages are accomplished by a melon harvester having a gently acting melon and vine pickup that includes an infeed conveyor formed with an elevator section and a vine delivery section pivoted relative thereto. The vine delivery section gently drops the fruit with vines attached onto parallel lane belt conveyors. Axially extending vine removal and pinch rollers at the sides of each conveyor grasp the vines from the sides of the advancing melons and remove them. These rollers direct the vines downwardly in a manner which prevents plugging and jamming of the vines between lanes. The handling features just described provide a minimum of bounce and inter-fruit damage and since the melons are supported on conveyors between the rollers, the vines are gently removed from the melons without damage to the fruit.

It is a feature of the harvester that the vines are uprooted or severed and gathered along with the melons. These vines serve as a cushion for the melons until they reach the de-viner assembly, thereby reducing melon damage.

Another feature of the present invention is that plugging is eliminated. This is accomplished by the de-viner assembly described above, coupled with a resilient universal joint mounting of the pinch rollers. The pinch rollers are mounted at their ends in a swivel-type mounting assembly that permits one or both ends of these rollers to lift from their associated vine removal rollers to clear masses or plugs of vines as they are removed from the melons. The lower, vine removal rollers are cantilever mounted which further minimizes plugging.

BRIEF DESCRIPTION OF THE DRAWINGS

FIG. 1 is a diagrammatic perspective of the infeed, de-viner and take-away conveyor assemblies of a harvester embodying the invention.

FIG. 1A is an enlarged section through the pickup.

FIG. 2 is a diagrammatic enlarged section through the de-viner assembly showing its mode of operation.

FIG. 3 is a side view of the harvester with the drive details omitted for clarity.

FIG. 4 is a plan view of the harvester.

FIG. 5 is an enlarged side view of the de-viner assembly.

FIG. 6 is a section taken on line 6—6 of FIG. 5.

FIG. 6A is a fragmentary section taken along line 6a—6a of FIG. 5.

FIG. 7 is a section taken on line 7—7 of FIG. 5.

FIG. 8 is a fragmentary section taken along line 8—8 of FIG. 6.

FIG. 9 is a section taken along line 9—9 of FIG. 6.

FIG. 10 is a diagrammatic perspective showing the mounting of the pinch rollers.

FIG. 11 is an enlarged section looking along line 11—11 of FIG. 10.

FIG. 12 is a section taken on line 12—12 of FIG. 11.

FIG. 13 is a section taken on line 13—13 of FIG. 11.

FIG. 14 is a diagrammatic perspective showing how the pinch rollers move under the influence of a mass of vines passing between them and the vine removal rollers.

FIG. 15 is a diagrammatic perspective showing the drives for the vine removal and pinch rollers as well as for the conveyor belts between adjacent sets of rollers.

GENERAL ARRANGEMENT

The general arrangement of a harvester embodying the present invention is illustrated in FIGS. 1–4. This is a once-over harvester in that all of the melons M will have substantially reached maturity, but most of them will still be attached to their vines V. The harvester of the present invention breaks off or uproots the vines as it gathers the melons, and hence it is essential that the vines be detached from the melons. Since the melons are substantially ripe, they cannot be subjected to rough treatment either in the pickup portion of the harvester or in the de-vining portion thereof. In the harvester of the present invention rapid harvesting and de-vining of melons is accomplished without damage to the fruit.

The harvester is built around a main frame indicated generally at 10, the structural details of which are not critical to the present invention. This frame can be made up of welded structural parts in accordance with conventional agriculture machine practice, and since this represents a mere matter of design, the details of the frame parts are not discussed.

The frame 10 is mounted on front wheels 12 and rear steering wheels 14 and in the embodiment shown, the harvester is intended to be self-propelled. Thus the front wheels are driven through a power train, engine and transmission assembly not illustrated. Self-propelled harvesters are now quite conventional in the agricultural art and since the propelling features are not critical to the present invention no detailed description thereof is presented.

In addition to the main frame 10, the framework includes a sub-frame 16 that mounts the pickup conveyors and has a delivery sub-frame 18 that mounts the de-vining assembly that will be described in detail presently.

The principal operating units of the harvester include an overhead sweep conveyor indicated generally at 20 which sweeps the ground and gathers melons M (along with the vines V attached thereto) onto an elevator conveyor, indicated generally at 30. The elevator conveyor 30 has an elevating section 32 and a delivery or drop off section 34 forming a continuation of the elevating section. The section 34 of the conveyor 30 drops the melons and vines onto a multi-line de-viner assembly 40 which forms an important feature of the present invention. In the de-viner, the melons are advanced in rows along each lane (FIG. 4) and while advancing, cooperating rolls (to be described) grip the vines from the sides of the melons, detach the vines from the melons and deposit the vines on the ground, (FIG. 2). The de-vined melons run off the de-viner assembly 40 and are gently deposited onto a take-away conveyor 50 which has an ascending run 52 (FIG. 3), and a delivery run 54. The melons are delivered to a trailing truck or trailer (not shown) and since they are undamaged and de-vined they are in market condition except for possibly sorting or other inspection activities that take place in the sorting sheds, in accordance with conventional practice.

PICKUP

As previously mentioned, a sub-frame 16 mounts the melon pickup which includes the overhead feed conveyor 20 and the ascending run 32 of the elevator conveyor 30. The pickup sub-frame 16 is pivoted on the main frame 10 by a shaft 60 (FIGS. 3 and 4) which is mounted in upstanding ears 62 (FIG. 3) projecting from the main frame 10 of the harvester. In order that the leading portion of the pickup conveyors be close to the ground for sweeping up melons, a pickup height adjustment is provided. This adjustment comprises hydraulic cylinder 64 (FIG. 3) that is central of the apparatus and can be remotely controlled by the operator in accordance with conventional hydraulic engineering in agricultural devices. The cylinder 64 is pivoted to the main frame 10 at 66 and the piston 68 of the cylinder is pivoted to a crank 70. The crank 70 operates a rock shaft 72 that operates side cranks 74. The cranks 74 are pivoted at 75 to side links 76, which in turn are pivoted at 78 to the sub-frame 16 for the pickup assembly. Thus by positioning the piston 68 in the hydraulic cylinder 64 (using conventional valves and controls) the overhead sweep conveyor 20 and the elevator conveyor 30 can be vertically adjusted to a position which will cause them to pick up the melons and attached vines for harvesting.

SWEEP CONVEYOR

The overhead sweep conveyor 20 is an endless belt having longitudinally spaced radial flights that are rigid enough to sweep up melons but are flexible enough to conform to irregularities in the ground but are firm enough to gather melons. As seen in FIG. 1A when the melons are swept onto the conveyor 30 they are constrained and as the harvester advances the vines are severed or uprooted without damage to the fruit. In the construction of the feed conveyor illustrated, a drive roller 80 is provided at the upper end of the conveyor 20, which roller is driven by a hydraulic motor 82 (FIG. 1). As with all of the drive motors, the motor 82 is connected to a pump (not shown) and to various controls conventional in modern agricultural equipment. Since details of the hydraulic equipment are not critical to the present invention, they are not described. The lower end of the sweep conveyor 20 includes an idler roller 84 mounted in the frame 16 and a rubberized fabric belt 86 is trained around the drive roll 80 and the idler roller 84.

Laterally spaced along the belt 86 are the transverse sweep flights 88, which are stiff enough to sweep up the melons but flexible enough to accommodate to the surface of the ground as well as to conform somewhat to the melons, thus avoiding damage to ripe fruit. As seen in FIG. 1A, the flights 88 are in the form of U-shaped members of rubberized canvas or the like, having legs 89 that are bonded to the endless belt 86. In the embodiment of the invention just described, the flights 88 are spaced along the belt 86 by a distance of about 8 inches and normally project radially from that belt by a distance of about 5 inches.

ELEVATOR CONVEYOR

As seen in FIGS. 1A and 3 the sweep conveyor 20 picks up melons and their attached vines and sweeps them up onto the elevator conveyor 30. The elevator conveyor is of the "-Noffsinger" chain type, common in the agricultural arts. The conveyor 30 is made of transverse rod flights 90 some of which are bent out as at 90a, and hence raised from the general plane of others. This prevents roll-back of melons on the conveyor. In accordance with conventional practice the ends of the flights are joined by interlocking hooks 92 (FIG. 1A) to form an endless chain. The conveyor chain is driven by spaced sprockets 94 (FIG. 1) which interfit with the transverse flights from the chain in a conventional manner. The sprockets 94 are on a shaft 96 driven by a roller chain sprocket assembly 98 and a hydraulic motor 99. The motor 99 is operated in a manner conventional with modern agricultural machinery.

Tracing the conveyor chain in the direction of pull from the drive sprockets 94 (FIGS. 1 and 3) the chain passes over idlers 96 and 98 that support the lower flight of the reach 34 and then are trained around a delivery idler 100. The upper flight of the delivery reach 34 of the chain is supported on an idler 102 and an idler 104 is provided on the pivot then shaft 60 previously described as also being the pivot for the pickup sub-frame 16. The shaft 60 also forms the pivot for the sub-frame 17 of the delivery section 34. The conveying reach of the chain runs upwardly beneath the lower reach of the sweep conveyor 20 as best seen in FIGS. 1A and 3. The pickup end of the chain is trained around an idler 106. Guidance of the chain is completed by an idler 108 and a take-up idler 110. The take-up mechanism is conventional, and since it is not critical to the present invention, it is not illustrated in detail.

The manner in which the delivery end of the sub-frame 17 for the conveyor reach 34 is supported on the de-viner assembly 40 will be described in detail presently.

DE-VINER ASSEMBLY

The de-viner assembly 40 forms an important feature of the present invention. In this assembly, even though the melons are ripe, and are harvested at a relatively rapid rate, the vines are detached smoothly from the melons without excessive tumbling, bouncing and jarring as the fruit passes along and is discharged from the de-viner. The de-viner assembly uses a pinch roll principle but since most of the fruit is ripe, the inertia of the fruit assists in keeping the melons in their longitudinal paths along the de-viner assembly while the vines are removed laterally of those paths.

Each lane on the de-viner assembly 40 comprises a longitudinally running belt conveyor 120 flanked by vine removal rollers 122, 124, (FIGS. 2, 4 and 15). Vine pinch rollers 126,128 are held into resilient engagement with the vine removal rollers 122,124, respectively. This structure is partially shown in the enlarged section of FIG. 2 (in this figure the melons M are moving towards the observer) as well as in a number of other figures mentioned and in the perspective of FIG. 10. In the embodiment illustrated, three lanes of the type described are provided. In other words three of the above conveyors 120 are mounted to receive melons and vines from the conveyor 30 and each conveyor 120 is flanked by sets of vine removal and vine pinch rollers (122,126; 124,128) just described. Each set of vine removal and vine pinch rollers 122,126 and 124,128 is rotated with the rollers running in opposite directions in a manner by which the vines are gripped and pulled laterally clear of the melons, as shown in FIG. 2.

The driving mechanism for the rollers is supported on the frame 18 for the de-viner assembly so that the assembly can be pivoted on the frame 10 to adjust the angle of inclination to the horizontal. As mentioned, the downward slope of the de-viner minimizes fruit bounce as melons are dropped onto the de-vinver. This adjustment is illustrated in FIG. 5 wherein the receiving end of the de-viner assembly is pivoted on the frame 10 at 130, there being a sector clamping device 131 to hold down this end of the de-viner. The other end of the de-viner 40 is pivotally supported at 132 by links 133 at each side of the apparatus, which links are adjustable in length and have their upper ends pivotally mounted on the frame 10 at 134, as seen in FIG. 3.

VINE REMOVAL ROLLERS

As mentioned, in the embodiment of the invention illustrated, the de-viner assembly 40 comprises three conveying lanes for melons, that is, there are three longitudinally running belt conveyors 120 (FIG. 4) as described. Each conveyor belt 120 is flanked by and partially overlies the relatively large diameter vine removal rollers 122,124 (FIG. 2). The vine removal rollers 122,124 are cantilever mounted from their melon receiving ends in order to eliminate vine plugging at their delivery ends.

As seen in FIGS. 5, 6 and 10, each vine removal roll is rotatably supported on a stiff, not rotating shaft 135 which is clamped between blocks 136,137 the lower block 137 being welded to brackets 138 projecting upwardly from the de-viner sub-frame 18. Each viner comprises a cylindrical steel tube 140 (FIG. 2) having a rubber cover 142. The roll cover has a smooth surface and has a Shore durometer of about 70 on scale A. Roller tubes 140 are supported on the shaft 130 by anti friction bearings 144,146 (FIG. 50 at each end. Drive sprockets 148 (see FIG. 15) are secured to the inner ends of each roll tube 140.

As seen in FIG. 2, adjacent vine removal rollers rotate in opposite directions and this rotation is provided by a drive chain 150 which is sinuously trained over the rollers as shown in FIG. 15. The chain 150 is driven by a sprocket 152 on a drive shaft 154 which shaft is driven by a chain and sprocket assembly 156 from a conventionally controlled hydraulic motor 158.

VINE PINCH ROLLERS

The vine pinch rollers 126,128 are resiliently pressed against their companion vine removal rollers 122,124 for gripping the vines and snapping them from the melons. These rollers are mounted for limited radial motion at both ends so that masses of vines anywhere along the rollers can deflect rollers without plugging. The rollers are driven through universal joint shafts to accommodate this roll deflection and the roller mountings permit limited sliding of the roll shafts to prevent binding during deflection.

Since all of the vine pinch rollers 126,128 are substantially of the same construction only one will be described in detail. Each roller has a central shaft 160 (FIG. 11) with a rubber cover 162 having herringbone ribs 164,164a. The ribs are patterned to urge veins away from the ends of the rollers toward a mid-portion of the rollers. The rubber covers are retained on the shafts 160 by large nuts 166 (FIG. 12). The ends of the shafts 160 are turned down at 170,172 for mounting a self-aligning bearing 174, of conventional construction. The rubber covers 162 have a Shore durometer of 30 on Scale A.

FIG. 11 shows the mounting for two intermediate pairs of vine removal rollers 126,128, each of which operates with vine removal rollers 122,124 but in different lanes. At the drive end of these rollers the self-aligning bearings 174 swivel in outer sleeves 180 from which project lateral mounting studs 182. These studs are threaded into a mounting block 184 that is clamped by a swivel bolt 186 to a vertical stud 188. The stud 188 forms an extension of a swivel post 190 that slides vertically in a fixed sleeve assembly 192. The sleeve assembly 192 is secured to brackets 194 that project upwardly from the sub-frame 18 of the de-viner assembly. (See also FIG. 10).

In order to urge each vine pinch roller against its associated vine removal roller, a spring 196 is disposed between the lower end of the fixed sleeve 192 and a nut and washer assembly 198 is mounted on an extension 199 of the swivel post 190.

The mountings of the delivery ends of the pinch rollers is shown in FIGS. 11 and 13. In this construction the turned down ends 172 of the roller shafts 170 are mounted in self-aligning bearings 174, as previously described. These bearings are housed in swivel sleeves 200 which are integral with a crosspiece 202 (FIG. 11). The crosspiece is mounted by a swivel bolt 204 on the inner part of a central self-aligning bearing 205. The outer sleeve of this bearing is on the upper end of a vertical stud 206 and to provide additional accommodation for the deflection of the rollers, rubber washers 208 are disposed at each side of the self-aligning bearing 205.

The stud 206 which projects upwardly from a swivel post 210 which is swivelly and slidably mounted in fixed sleeve 212. The sleeve 212 is secured to a bracket 214 that projects upwardly from the sub-frame 18 of the de-viner assembly. In order to urge these ends of the vine pinch rollers against the associated vine removal rollers, springs 217 are compressed between the sleeve 212 and a nut and washer assembly 218 on a stud 219. With the construction just described, although the rollers are mounted in pairs, each pinch roller can be deflected away from its associated vine removal roller by a mass of vines or the like without binding the drive to the deflected pinch roller or to the other roller pinch mounted therewith.

The outer vine pinch rollers of the assembly, namely rollers 126 and 128 (FIGS. 10) are mounted singly and hence their swivel mountings are different from and somewhat simpler than that for the paired rollers just described in connection with FIGS. 11 – 13.

Referring to FIGS. 6, 8 and 10, the shaft ends 170,172 for the outer rollers are mounted in swivel arms 220,222 by means of self-aligning bearings such as the bearings 174 previously illustrated. The arms 220,222 are pivotally mounted on ears 224 secured to the sub-frame 18 of the de-viner assembly. The pivot for the arm 222 is a self-aligning bearing. Springs 228 (FIGS. 6 and 10) are connected between the frame and the swivel arms 220, 224 for urging the singly mounted vine pinch rollers against their vine removal rollers.

The drives for the vine pinch rollers, which accommodate the deflection thereof, are illustrated diagrammatically in FIG. 14 and comprise a double universal joint assembly.

Referring to FIGS. 5, 6A and 15 for details, the inner shaft ends 170 are connected to universal joints 230 (see also FIG. 11). These universal joints have drive stub shafts 231 (FIG. 5) that have a square cross section (FIG. 6A) which slide in sleeves 231a projecting from a second universal joint 232 (FIGS. 5 and 15). The second universal joints 232 are driven by stub shafts 234 that mount sprockets 238 (FIG. 15). A chain 240 is chained around the sprockets 238 in a matter so that adjacent vine pinch rollers rotate in opposite directions. The chain 240 is driven by a sprocket 242 (FIG. 15) on a drive shaft 244. The shaft 244 is driven by a gear 246 meshed with a gear 248 on the shaft 154 previously described as driving the sprocket 152 for the vine removal rollers. The chain and sprocket assembly for the vine pinch rollers is mounted in a housing 250 (FIG. 5) secured to the subframe 18 of the de-viner assembly. In the drive connection just described, radial deflections of one or both ends of each vine pinch roller 126,128 are freely accommodated without binding any of the driving or rotating parts on any of the the individual rollers.

TROUGH CONVEYOR

As seen in FIG. 2, each trough conveyor 120 is disposed between adjacent vine removal rollers 122,124 adjacent their upper peripheries. The trough conveyors are formed as endless flexible belts of rubberized fabric or the like and have side lips 254 which assist in preventing the melons from being pulled against the rotating of vine removal rollers. Each belt 120 also has an internal guide rib 256.

The belts 120 are trained around grooved drive pulleys 260 (FIGS. 5, 9 and 15) at the delivery ends of the belts. The vine receiving ends are trained around pulleys 262 and take-up pulleys 264. As seen in FIGS. 5 and 9, the take-up pulleys 264 are mounted on pivoted arms 266 pinned at their upper ends to the framework of the apparatus and urged in a direction to take up slack in the conveyor belts 120 by means of springs 268 connected to the frame. As mentioned, the various pulleys about which the belts 120 are trained are centrally grooved to receive the belt guide ribs 256.

As seen in FIG. 6, the upper reaches of the conveyor belts 120 are supported on rails 270 supported at 271 (FIGS. 5, 6 and 9) on the clamp block 136 which supports the shaft 135 previously described and on a shaft 272 at 271a (FIG. 9). The rails 270 prevent sagging of the conveyor belts under the weight of the melons being advanced by the belts. The drive rollers 260 are mounted on the shaft 272 (FIG. 15) which is driven by hydraulic motor 274 in accordance with conventional engineering practice.

Thus with the construction just described, melons deposited on the de-viner assembly 40 immediately find their way to the conveyor belts 120 and are advanced along those belts. The vines lie across the vine pinch rollers and are soon picked up by those rollers and brought between them and the vine removal rollers, as illustrated in FIG. 2.

INFEED CONVEYOR SUPPORT

As previously mentioned, the sub-frame 17 for the delivery section 34 of conveyor 30 is pivotally mounted at 60 (FIG. 3). As will now be described the delivery end of the conveyor section 34 is supported by gravity on the sub-frame 18 of the de-viner assembly 40. This construction accommodates variations in the angle of inclination of the de-viner assembly 40 by adjustment of the links 136, without changing the drop height of melons deposited on the de-viner. This motion accommodating construction appears in FIGS. 5 and 6 is provided simply by providing the infeed conveyor or sub-frame 17 with side support flanges 280 which are slidably supported on shoes 282 mounted on the sub-frame 18 of the de-viner.

SIDE GUIDES

The de-viner assembly 40 has side guides that confine material to the de-viner during the de-vining operation. As seen in FIGS. 5 and 7, longitudinal rails 290 are provided at each side of the de-viner sub-frame 18. These rails mount upstanding brackets 292 to which are bolted side flange mounting channels 294 (FIG. 7). The channels 294 support metal side guides 296, having rubber covers 298, bonded thereto. Flexible wipers 300 project downwardly from between the rubber covers 298 and the side guides 296 for engaging the outer vine pinch rollers, such as the roller 126 illustrated in FIG. 7.

TANGENCY PLANES

As seen in FIG. 2, tangency planes P1 and P2 between associated rollers 124,128 and 122,126 intersect at a point L. The point L is above the plane P3 passing through the axes of the vine removal rollers 122,124. This roller geometry has been found to facilitate vine disposal between adjacent vine removal rollers 122,124 without wrap around.

TAKE-AWAY CONVEYOR

Upon leaving the de-viner 40 the de-vined melons M drop a short distance onto the ascending run 52 of the take-away conveyor 50 as previously described, and are carried by a horizontal run 54 that discharges melons from the harvester. The take-away conveyor 50 comprises an endless belt 310 (FIGS. 1 and 3) having longitudinally spaced, transverse flights 312. The belt is trained around a drive roller 314 driven by a hydraulic motor 316 in accordance with conventional agricultural practice, (FIG. 1). The belt is trained around an upper direction changing roller 318, a lower end roller 320 and a lower direction changing roller 322. As seen in FIG. 3, the ascending run 52 of the take-away conveyor is always close to the delivery end of the de-viner assembly 40 and its angle of ascent minimizing damage to the de-vined melons.

| Typical Operating Features | |
|---|---|
| Ground speed of the harvester | 2.0 mph. |
| Linear speed of pickup conveyors 20 and 30 | Matched to ground speed. |
| Peripheral speed of vine removal and vine pinch rollers | 550 ft./min. |
| Linear speed of conveyor belts 120 | 88 ft./min. |
| Angle of inclination of de-viner 40 from horizontal | 7 degrees |
| Diameter of vine removal rollers | 6 inches |
| Diameter of vine pinch rollers | 3 inches |
| Length of rollers | 48 inches |
| Number of melons harvested per hour | 15,000 |

OPERATION

In operation (FIG. 3) melons M and the vines V are swept up from the ground by the flights 88 of the overhead conveyor 20. This conveyor sweeps the crop into the ascending section 32 of the conveyor 30, the descending run 34 of the conveyor 30 gently drops the crop into the de-viner assembly 40.

Referring to FIG. 2, melons tumble onto the longitudinally running conveyor belts 120 and are partially confined by the side lips 254 of those belts. Melons that fall on the upper rollers 126,128 immediately drop onto the belts 120. The vines V will fall against the vine pinch rollers 126,128 (and on the lower rollers as well) and will soon find their way between the upper rollers and their associated vine removal rollers 122,124. The peripheral speed of these rollers is such that the vines are cleanly jerked or snapped from their melons M and due to the geometry shown in FIGS. 2, the vines are directed downwardly over the vine removal rollers to the ground. It has been found with this geometry there is no plugging or wrap-around of the vines in the harvesting machine.

IT will be recognized that the harvester is intended for once-over operation and hence almost all of the melons will be ripe. Thus the vines can be detached from the melons without drawing them against the rollers. The de-vined melons M are gently dropped onto the take-away conveyor 50 and deposited onto a truck or trailer running along behind the machine in accordance with conventional agricultural practice.

Thus with the harvester of the present invention, ripe melons can be harvested rapidly on a multi-lane machine without damage while gently removing all the vines from the melons. All this is accomplished without plugging or jamming of the machine with the vines being removed.

Although the best mode contemplated for carrying out the present invention has been herein shown and described, it will be apparent that modification and variation may be made without departure from what is regarded to be the subject matter of the invention.

What we claim is:

1. Apparatus for de-vining fruit, melons or the like comprising a frame, a longitudinal infeed conveyor;
   a de-viner assembly comprising a de-viner conveyor for the fruit running longitudinally forwardly from beneath the delivery end of said infeed conveyor, laterally spaced, longitudinally extending vine removal rollers disposed at each side of and with the major portion thereof disposed beneath the conveying reach of said de-viner conveyor, a vine pinch roller extending along the upper side of each vine removal roller and spaced from the associated side of said de-viner conveyor, means for resiliently urging said pinch and removal rollers together, and means for rotating each pair of vine removal and pinch rollers in opposite directions so that they pull vines laterally away from fruit or the like advancing on the de-viner conveyor.

2. The apparatus of claim 1, wherein at least two of said de-viner assemblies are mounted side by side; the vine pinch rollers being disposed along their respective vine removal rollers in positions wherein the tangency planes of the paired rollers intersect along a line that is above a plane through the axes of the vine removal rollers for minimizing wrap around of the vines.

3. The apparatus of claim 2, wherein said vine removal rollers are formed of an elastomer and have a Shore durometer of about 70 on Scale A, and the pinch rollers have a durometer of about 30.

4. The apparatus of claim 1, wherein said rollers have a peripheral speed of about 550 ft./min.

5. The apparatus of claim 4, wherein said de-viner conveyor is a belt conveyor and has a linear speed of about 88 ft./min.

6. The apparatus of claim 1, wherein said conveyors are endless belts having side lips adjacent the vine removal rollers.

7. The apparatus of claim 2, wherein said vine removal rollers are cantilever mounted on the frame at their crop-receiving ends.

8. The apparatus of claim 2, comprising swivel mounting means for said vine removal rollers.

9. The apparatus of claim 8, wherein said roller drive means comprises universal joint shafts at the crop-receiving ends of the rollers.

10. The apparatus of claim 1, wherein said infeed conveyor has an ascending run section and a delivery run section extending downwardly from the ascending run section, means for pivotally mounting said conveyor sections on the frame at their juncture, and means for pivotally mounting said de-viner assembly on the frame below the delivery section of said infeed conveyor.

11. The apparatus of claim 10, comprising means for supporting the delivery end of the delivery section of said infeed conveyor on said pivotally mounted de-viner assembly for maintaining a constant drop as the angle of inclination of the de-viner assembly is varied.

12. The apparatus of claim 11, wherein said infeed conveyor sections are pivotally mounted on said frame along the same axis.

13. Apparatus for de-vining fruit, melons or the like comprising a main frame, a longitudinal infeed conveyor on said main frame; a de-viner assembly on said main frame comprising a sub-frame, a de-viner conveyor for the fruit running longitudinally forwardly from beneath the delivery end of said infeed conveyor, laterally spaced, longitudinally extending vine removal rollers on said sub-frame and disposed at each side of and beneath the conveying reach of said de-viner conveyor, a vine pinch roller extending along each vine removal roller and spaced from the associated side of said conveyor, means mounting said vine pinch rollers on said sub-frame and disposed at each side of and beneath the conveying reach of said de-viner conveyor, means mounting said vine pinch rollers on said sub-frame for resiliently accommodating limited separation of the pinch rollers from the vine removal rollers upon the passage of vines between the pinch and removal rollers, and means for rotating each pair of vine removal and pinch rollers in opposite directions so that they pull vines laterally away from fruit or the like advancing on the de-viner conveyor.

14. The apparatus of claim 13, wherein at least two of said de-viner assemblies are mounted side by side on said subframe; said vine pinch roller mounting means comprising resiliently retracted swivel posts on said subframe having arms for mounting the vine pinch rollers.

15. The apparatus of claim 14, wherein said arms for adjacent vine pinch rollers form unitary cross bars with said swivel posts.

16. The apparatus of claim 15, wherein one end of each vine pinch roller is mounted for limited axial sliding motion.

17. Apparatus for de-vining fruit, melons or the like comprising a frame, a longitudinal infeed conveyor; a de-viner assembly running longitudinally forwardly from beneath the delivery end of said infeed conveyor and comprising laterally spaced, longitudinally extending vine removal rollers, a vine pinch roller extending along each vine removal roller, means for rotating said rollers so that they pull vines away from fruit or the like advancing on the assembly, said infeed conveyor having an ascending run section and a delivery run section extending downwardly from the ascending run section, means for pivotally mounting said conveyor sections on the frame at their juncture, and means for pivotally mounting said de-viner assembly on the frame below the delivery section of said infeed conveyor.

18. The apparatus of claim 17, comprising means for supporting the delivery end of the delivery section of said infeed conveyor on said pivotally mounted de-viner assembly for maintaining a constant drop as the angle of inclination of the de-viner assembly is varied.

19. The apparatus of claim 18, wherein said infeed conveyor sections are pivotally mounted on said frame along the same axis.

* * * * *